Figure 1:
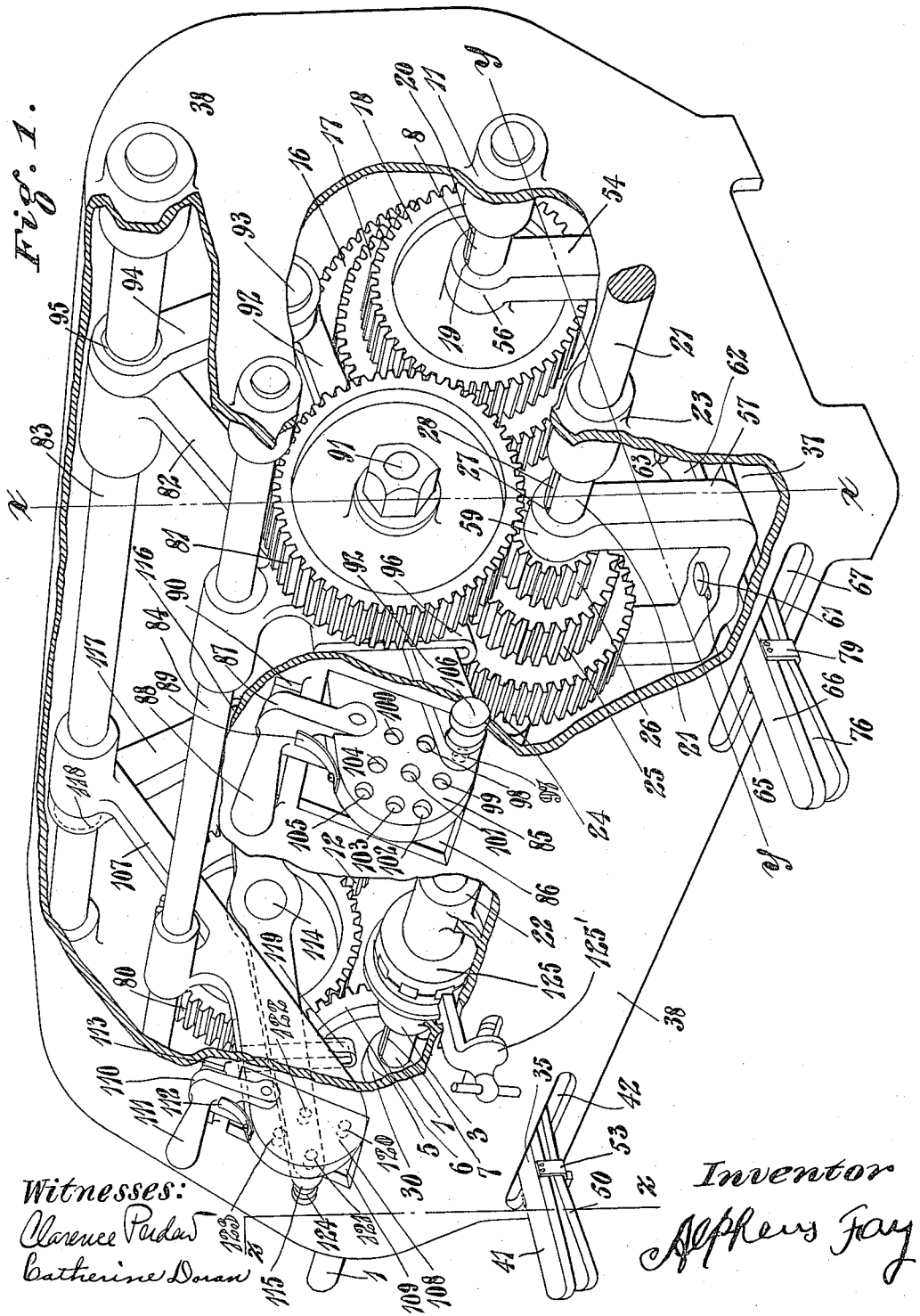

A. FAY.
CHANGE SPEED MECHANISM.
APPLICATION FILED APR. 6, 1914.

1,169,388.

Patented Jan. 25, 1916.
6 SHEETS—SHEET 1.

Witnesses:
Clarence Perdew
Catherine Doran

Inventor
Alpheus Fay

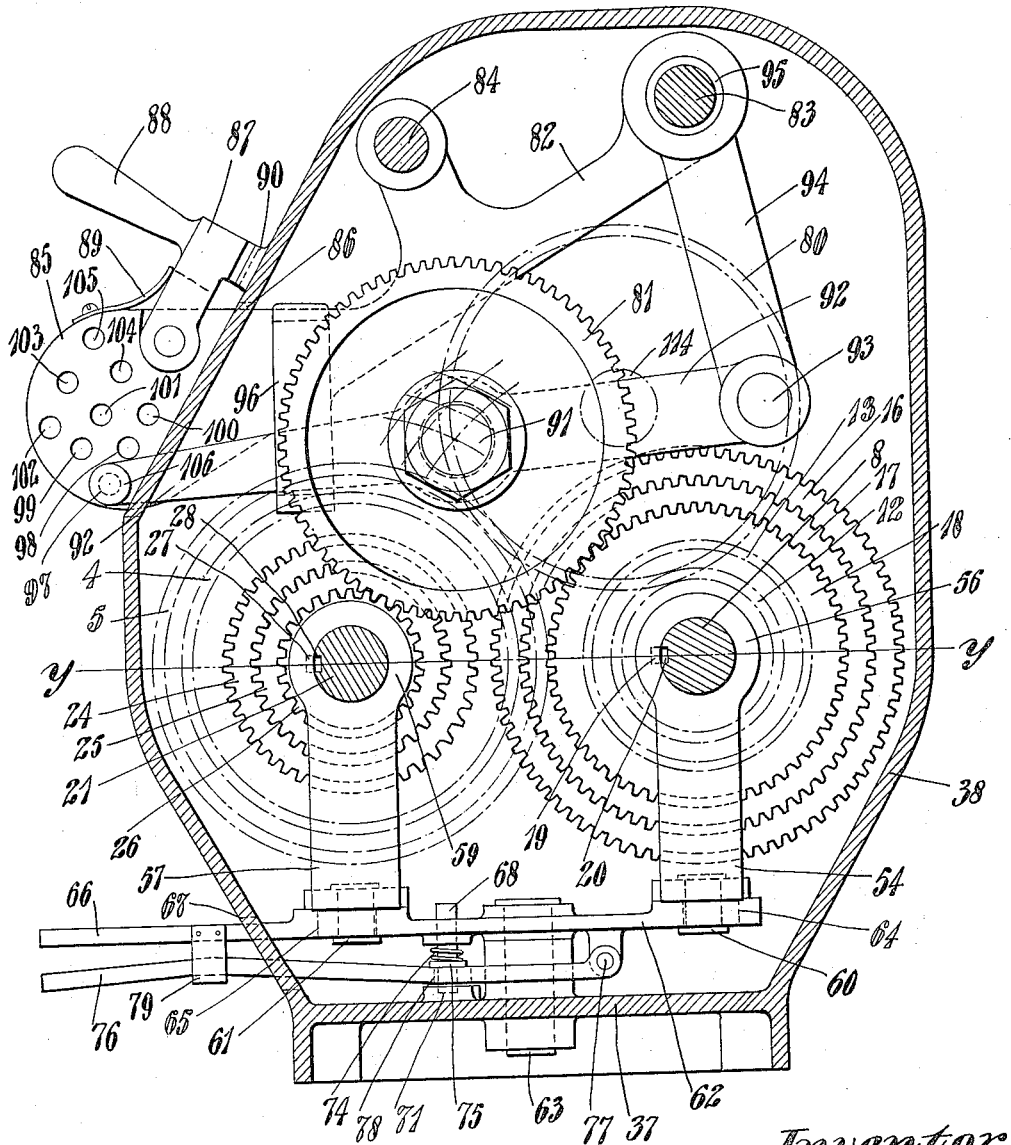

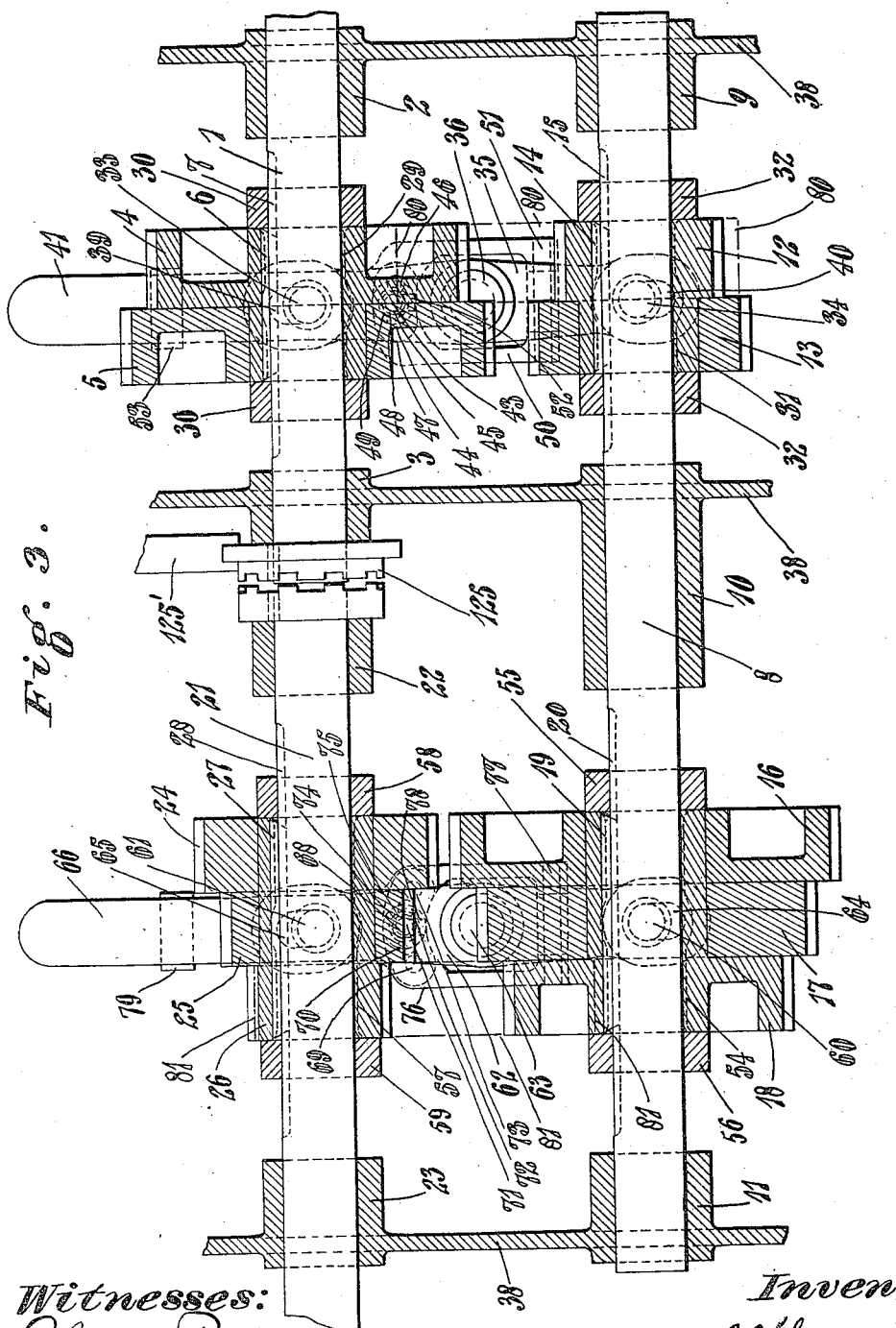

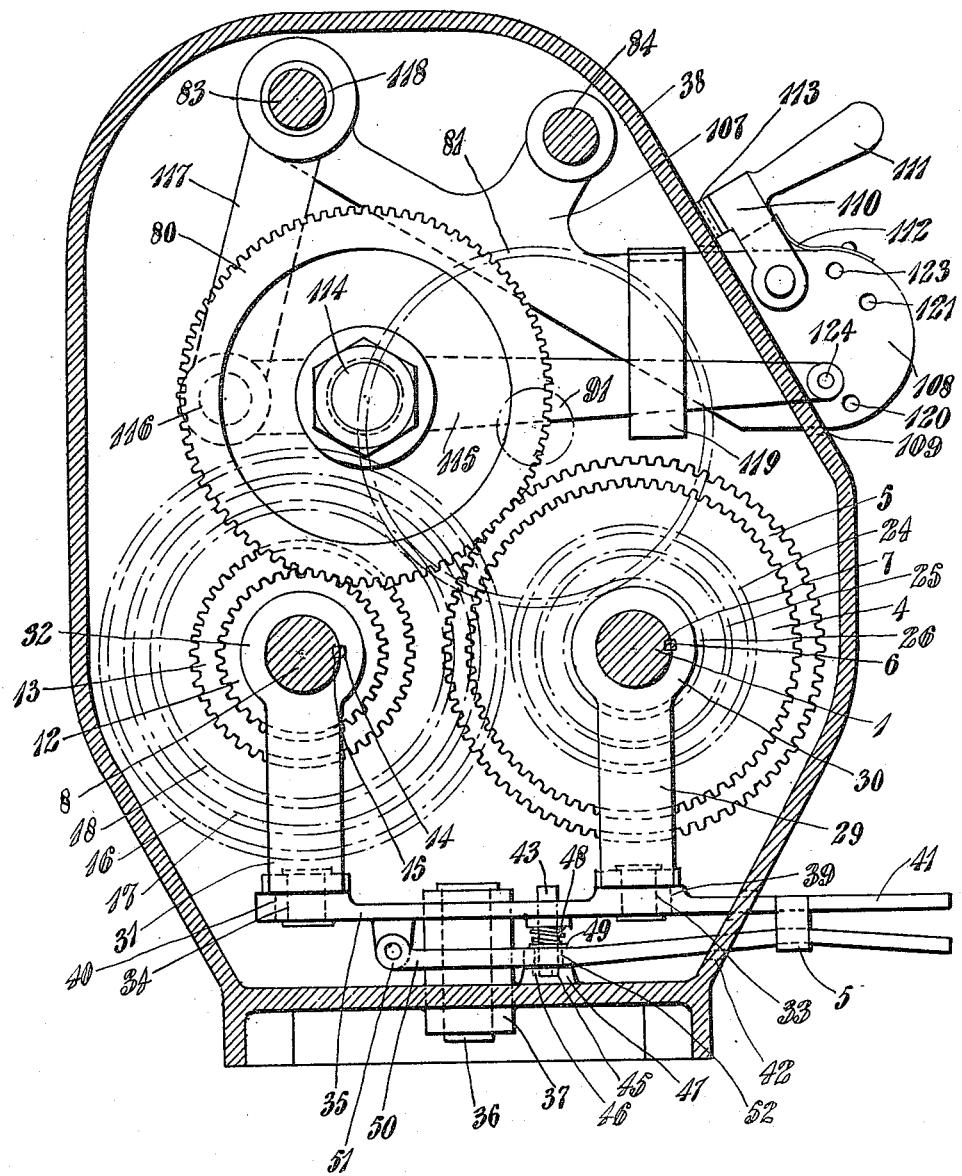

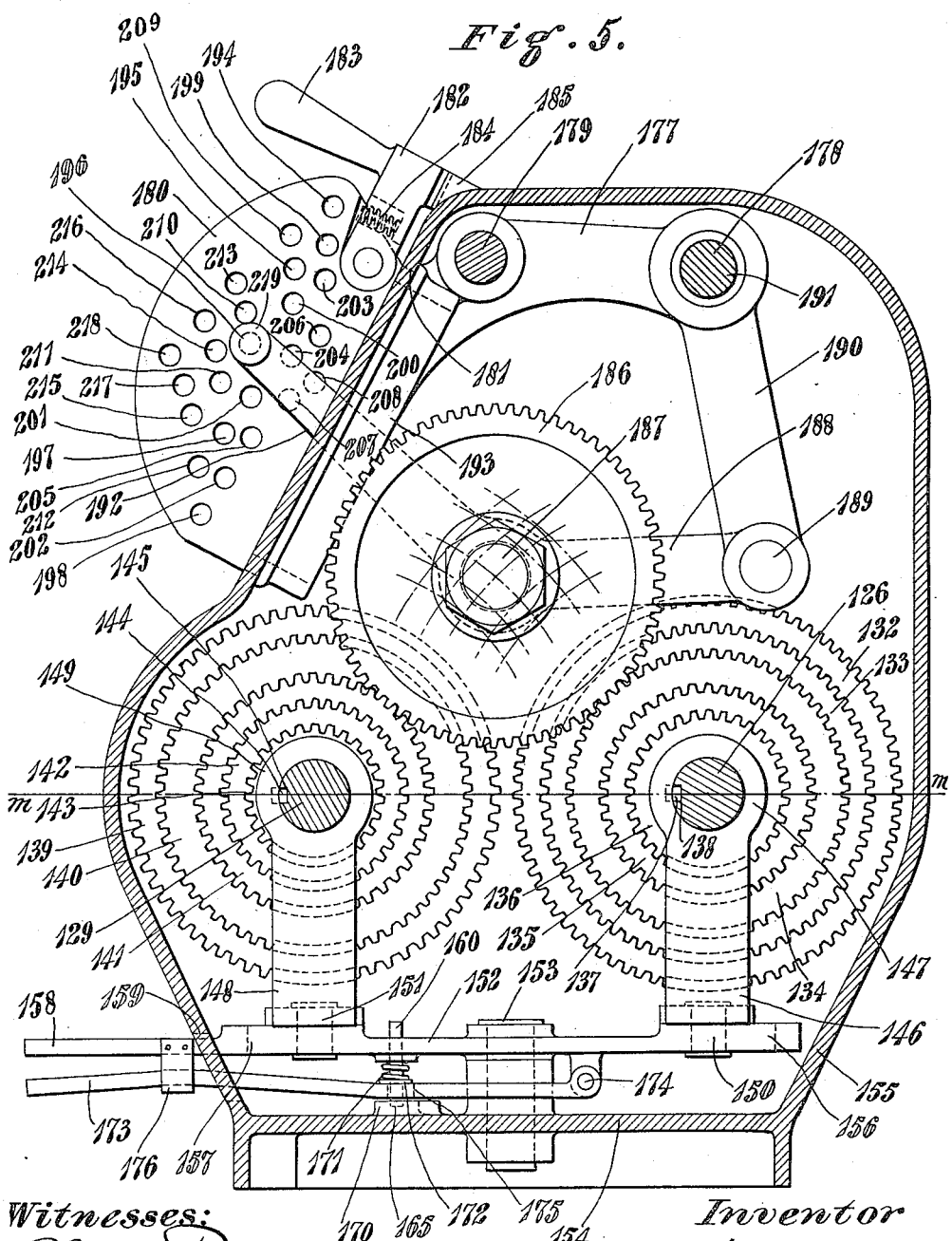

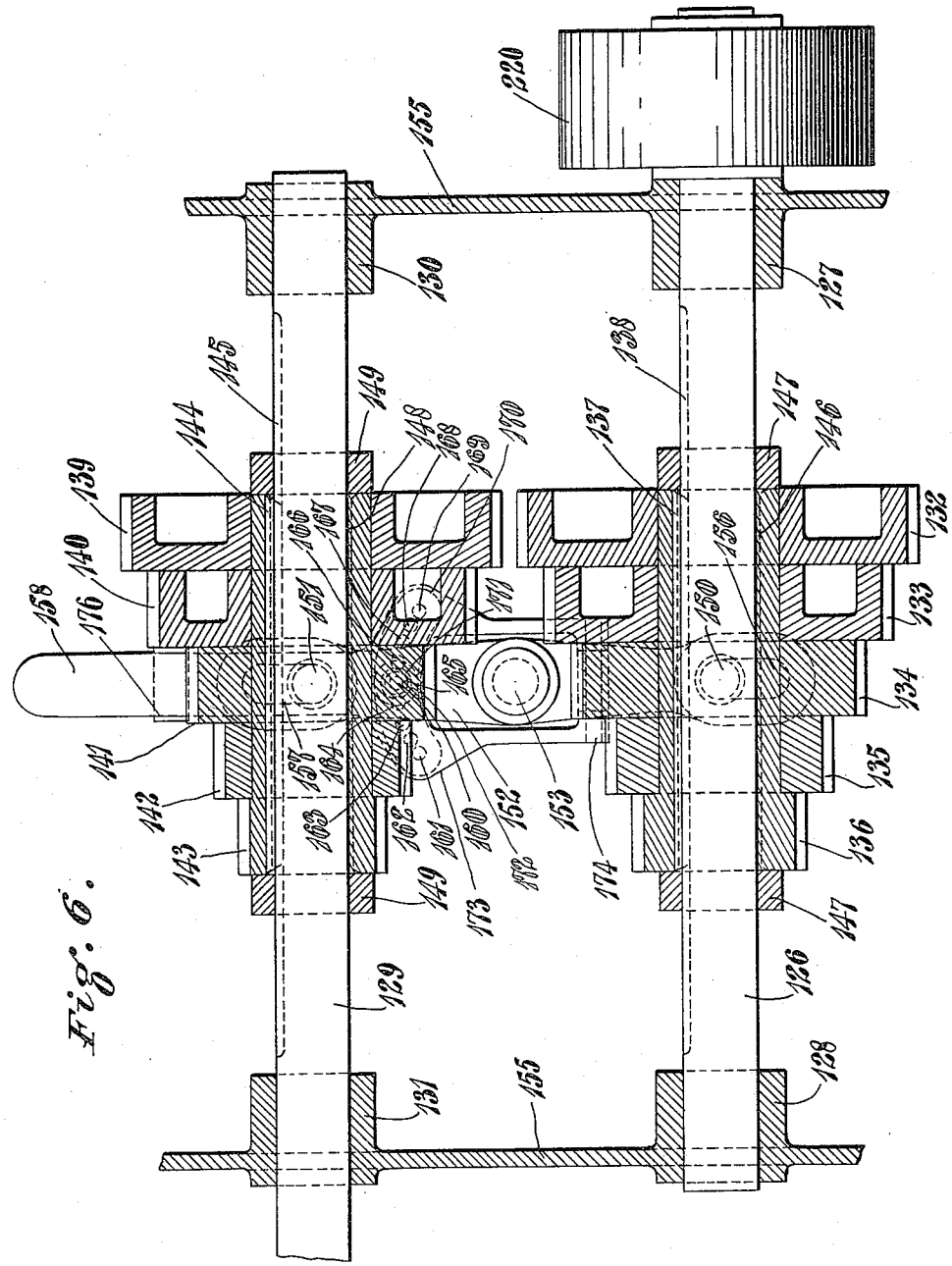

UNITED STATES PATENT OFFICE.

ALPHEUS FAY, OF LOUISVILLE, KENTUCKY.

CHANGE-SPEED MECHANISM.

1,169,388. Specification of Letters Patent. Patented Jan. 25, 1916.

Application filed April 6, 1914. Serial No. 829,981.

*To all whom it may concern:*

Be it known that I, ALPHEUS FAY, a citizen of the United States, and a resident of Louisville, in the county of Jefferson and State of Kentucky, have invented a certain new and useful Change-Speed Mechanism, of which the following is a specification.

My invention relates to gearing and its object is to secure a relatively large number of changes of speed in the driving of mechanisms of various kinds with a relatively small number of parts whereby the mechanism is correspondingly simple, economical in construction and convenient in use.

My invention consists in the parts and in the details of construction and arrangement of parts as will hereinafter be more fully described and claimed.

In the drawings: Figure 1 is a general perspective view of a device embodying my invention in which two sets of gears are used, one set with two pairs and the other with three pairs of gears; Fig. 2 is a section on a line corresponding to the line $x$—$x$ of Fig. 1 looking toward the left; Fig. 3 is a horizontal cross section showing part of the device, the section being taken on a line corresponding to the line $y$—$y$ of Fig. 1 or Fig. 2; Fig. 4 is a section on the line $z$—$z$ of Fig. 1, looking toward the right, Fig. 5 is a vertical cross section similar to Fig. 2, but showing a modification in which but one set of five pairs of gears is used; and Fig. 6 is a horizontal cross section on a line corresponding to the line $m$—$m$ of Fig. 5.

As shown in Figs. 1 to 4, the work or driven shaft 1 is journaled in bearings 2 and 3 and between these bearings has the two spur gears 4 and 5 fixed together and coaxial on said shaft 1, with a key 6 fixed in them and projecting into a keyway 7 in the shaft 1 which keyway is long enough to allow the gears to slide over one-half the width of one of the gears in either direction from a mid-position, the gears 4 and 5 being of equal width. A lay shaft 8 is journaled parallel with driving shaft 1 in bearings 9, 10 and 11, thus extending the full length of the device. Between the bearings 9 and 10 this lay shaft 8 has two intermediate gears 12 and 13 fixed together and coaxial on this shaft 8 with a key 14 fixed in them and projecting into a keyway 15 in said shaft 8 of such length that these two gears 12 and 13 may slide in either direction from mid-position half the width of one of the gears, said two gears being of equal width.

Between the bearings 10 and 11 this lay shaft has three other intermediate gears 16, 17 and 18 fixed together and coaxial on said shaft 8 with a key 19 fixed in them and projecting into a keyway 20 in said shaft 8 of sufficient length to allow the three gears to slide in either direction from mid-position the full width of one of the gears, said three gears being of equal width. A driving shaft 21 is journaled in bearings 22 and 23 in alinement with work or driven shaft 1 and consequently parallel with the lay shaft 8. Between bearings 22 and 23 this driving shaft 21 has the three driving gears 24, 25 and 26 fixed together and coaxial on said shaft 21 with a key 27 fixed in them and projecting into a keyway 28 in said driving shaft 21 of sufficient length to allow said three driving gears to slide in either direction from mid-position the full width of one of these gears, said three gears being of equal width. Thus arranged, it is possible to bring either one of the gears 4 or 5 radially in alinement with either one of the gears 12 and 13 and it is possible to bring any one of the three gears 16, 17 and 18 radially in alinement with any one of the three gears 24, 25 and 26. The diameters of the various gears thus brought opposite to each other is so limited that none of them can mesh together, it being the purpose of the invention to merely bring such gears opposite in order to mesh an idler gear with them. The mountings of such idler gears will be later described.

In order that the gears 4 and 5 may be moved simultaneously with the gears 12 and 13 but in opposite directions, the gears 4 and 5 are provided with a fork 29 with hubs 30 to flank the gears 4 and 5 and to slide on the shaft 1 and move said gears sidewise, as described, and a fork 31 with hubs 32 flanking the gears 12 and 13, slides on shaft 8 to move the gears 12 and 13 sidewise. These forks 29 and 31 have studs 33 and 34, respectively, and a lever 35 has a pivot 36 mounted in the base 37 of the casing 38 equally distant from the center lines of the shafts 1 and 8 and slots 39 and 40 are provided in said lever to receive the studs 33 and 34, respectively. Said lever 35 has a handle 41 that projects out through a slot 42 in the side of the casing 38. Close to the pivot 36 the lever 35 has a detent 43 which slides vertically in the lever and may project into any one of three sockets 44, 45 and 46 in a boss 47 on the base 37 of the casing 38 and thus hold the lever 35 stationary in any one of three positions. This detent 43 is normally held down in any one of the sockets by a helical spring 48 confined around the detent between the under side of the lever and a flange 49 on the detent. To lift the detent out of the socket, a detent lever 50 has a fulcrum 51 on the lower side of the lever 35 close to the pivot 36, on the opposite side from the detent 43, and is recessed around the mounting of the pivot 36 and has a slot 52 through which the detent extends into its sockets, with the flange 49 bearing against the upper side of this detent lever 50. A stirrup 53, fixed to the lever 35, receives and guides the outer end of the detent lever 50 outside the casing 38. Thus, the gears may be manipulated by grasping the handle 41 and the free end of the detent lever 50, pulling the detent lever upward and releasing the detent 43 from the socket, and then swinging the lever 35 in the proper direction. The parts are so arranged that when the detent 43 is in the middle socket 45, gears 4 and 12 will be opposite and gears 5 and 13 will be opposite; when the detent is in the socket 44, gears 4 and 13 will be opposite; and when the detent is in the socket 46, gears 5 and 12 will be opposite.

The gears 16, 17 and 18 have a fork 54 with hubs 55 and 56 flanking said gears and sliding on the shaft 8 to move the gears sidewise, as above described, and the gears 24, 25 and 26 have a fork 57 with hubs 58 and 59 flanking the gears and slidable on the driving shaft 21 to slide said gears sidewise as has been described. These forks 54 and 57 have studs 60 and 61, respectively, and a lever 62 similar to the lever 35 has a pivot 63 in the base 37 of the casing 38, equally distant from the center lines of the shafts 8 and 21, and slots 64 and 65 are provided in this lever to receive the studs 60 and 61, respectively. The lever has a handle 66 projecting outside the casing 38 through a slot 67, and has a detent 68 to enter any one of five sockets 69, 70, 71, 72 and 73 in a boss on the base 37 of the casing 38. This detent 68 is held down by a helical spring 74 around the detent between the lower side of the lever 62 and a flange 75 on the detent 68, and a detent lever 76 with a fulcrum 77 and a slot 78 through which the detent 68 extends, is guided in a stirrup 79 on the lever 62. Thus, these gears may be shifted in the same manner as that described for shifting the other gears, with the exception that there are five positions instead of three. By these means, in the first position, as shown in Fig. 2, gears 16 and 24, 17 and 25, and 18 and 26 are opposite, respectively. In the first position to the left, gears 17 and 24 and 18 and 25 will be opposite; and in the next position to the left gears 18 and 24 will be opposite. In the first position to the right, gears 16 and 25 and gears 17 and 26 will be opposite; and in the next position to the right gears 16 and 26 will be opposite.

To mesh with gears 4 and 12, 5 and 13, 5 and 12 or 4 and 13, according to the positions of the gears, an idler gear 80 is provided; and to mesh with the gears 16 and 24, 17 and 25, 18 and 26, 18 and 25, 17 and 24, 18 and 24, 16 and 25, 17 and 26, or 16 and 26, an idler gear 81 is provided.

A yoke 82 slides parallel with the shafts 1, 8 and 21, on bars 83 and 84 fixed in the casing 38 and has an index plate 85 projecting out through a wide slot 86 in the front of the casing 38. Pivoted on this index plate 85 is a detent 87 with a handle 88 and this detent is pressed down by a flat spring 89 and enters notches in a boss 90 on the front of the casing so as to hold the yoke 82 against movement along its bars 83 and 84. The idler gear 81 turns on a stud 91 fixed in an arm 92 which has a pivot 93 on the end of a link 94 that is pivoted on a sleeve 95 on the yoke 82 around the bar 83 on which the yoke slides. The free end of the arm 92 extends outside the casing through the slot 86 alongside the index plate 85 and is guided for swinging in a vertical plane by a stirrup 96 on the side of the yoke 82. This index plate 85 has a series of nine recesses or sockets 97, 98, 99, 100, 101, 102, 103, 104 and 105, and the arm 92 has a detent 106 which is adapted to enter any one of these recesses or sockets accordingly as the arm 92 is swung up and down or backward and forward by virtue of its mounting with the link 94. The recesses or sockets are so positioned in the index plate 85 that the nine different positions given to the arm 92, and consequently to the idler gear 81, will bring said idler gear into its proper position to mesh with the desired pair of gears brought opposite in any one of the five positions of the lever 35, as above described.

The idler gear 80 has a yoke 107 that also slides on the bars 83 and 84. This yoke has an index plate 108 projecting out through a wide slot 109 in the front of the casing 38. The detent 110 is pivoted on this index plate, with a handle 111, and is pressed down by the flat spring 112 and enters notches in a boss 113 on the front of the casing, to hold the yoke 107 stationary in any one of its three adjustments lengthwise of the bars 83 and 84. The idler gear 80 turns on a stud 114, fixed in an arm 115, which arm is connected by the pivot 116 to the link 117, this link being pivoted on the sleeve 118 on the yoke 107 around the bar 83. The free end of the arm 115 extends alongside the index plate 108 and is guided by the stirrup 119 on the yoke 107, and the index plate 108 has a series of four recesses, 120, 121, 122 and 123, in any one of which the detent 124 of the arm 115 may engage as the arm 115 swings up and down or backward and forward by virtue of its mounting with the link 117. These recesses or sockets are so positioned in the index plate 108 that the four different positions given to the arm 115, and consequently to the idler gear 80, will bring said idler gear into its proper position to mesh with the desired pair of gears brought opposite in any one of the three positions of the lever 62, as before described.

From the foregoing description, it will be seen that four combinations are possible between the driven shaft 1 and the lay shaft 8 and nine combinations are possible between said lay shaft 8 and the driving shaft 21, and, combining the two combinations, thirty-six different combinations are possible from the driving shaft 21 around through the lay shaft 8 to the driven shaft 1. An additional speed is obtained by joining the driving shaft and the driven shaft directly by means of the clutch 125 which is provided on the end parts of the two shafts between the bearings 3 and 21, this clutch being operated by a suitable handle device 125'. Thus, a total of thirty-seven different speeds may be obtained, with a structure involving the use of only twelve gears and one clutch, while the manipulative mechanism is limited to two gear shifting levers, the two idler gear shifting brackets, and the two arms carrying said idler gears on the brackets.

In the modification shown in Figs. 5 and 6, the lay shaft is dispensed with, and the driving shaft 126 is mounted in bearings 127 and 128, while the driven shaft 129 is mounted, parallel with the driving shaft, in bearings 130 and 131. Between the bearings 127 and 128, the driving shaft has five driving gears 132, 133, 134, 135, and 136, fixed together and coaxial on said shaft 126, with a key 137 fixed in them and projecting into a keyway 138 in said shaft 126, of sufficient length to allow the five gears to slide in either direction from mid-position the full width of two of the gears, said five gears being of equal width.

Between the bearings 130 and 131, the driven shaft 129 has the five driven gears 139, 140, 141, 142, and 143, fixed together and coaxial on said shaft 129, with a key 144 fixed in them and projecting into a keyway 145 in said shaft 129, of sufficient length to allow said five driven gears to slide in either direction from mid-position the full width of two of these gears, said five gears being of equal width. Thus arranged, it is possible to bring any one of the five gears 132, 133, 134, 135, and 136, radially in alinement with any one of the five gears 139, 140, 141, 142, 143, and 144, as in the case of the two pairs of gears in one end, or the three pairs of gears in the other end, of the example of Figs. 1 to 3, inclusive.

The two sets of gears, arranged on the two shafts as above described, are moved simultaneously in opposite directions to effect the different alinements; the driving gears having the fork 146 with hubs 147 to flank the gears and to slide on the shaft 126 and move the gears sidewise as described; and the driven gears having the fork 148 with hubs 149 flanking the gears and sliding on the shaft 129 to move these gears sidewise. These forks have studs 150 and 151, respectively, and a lever 152 has a pivot 153 mounted in the base 154 of the casing 155, equally distant from the center lines of the shafts 126 and 129, and slots 156 and 157 are provided in said lever to receive the studs 150 and 151, respectively. The lever has a handle 158 projecting out through a slot 159 in the side of the casing 155. Close to the pivot 153, the lever has a detent 160 which slides vertically in the lever and may project into any one of the nine sockets 161, 162, 163, 164, 165, 166, 167, 168 and 169, in a boss 170 on the base 154 of the casing 155, and thus hold the lever 152 stationary in any one of the nine positions. This detent 160 is normally held down in any one of the sockets by a helical spring 171, confined around the detent between the under side of the lever and a flange 172 on the detent. To lift the detent out of the socket, a detent lever 173 has a fulcrum 174 on the lower side of the lever 152, close to the pivot 153, on the opposite side from the detent 160, and is recessed around the mounting of the pivot 153 and has a slot 175, through which the detent extends into its sockets with the flange 172 bearing against the upper side of this detent lever 173. A stirrup 176, fixed to the lever 152, receives and guides the outer end of the detent lever 173 outside the casing 155. Thus, the gears may be manipulated by this mechanism as has hereinbefore been described in connection with the other example. From the description in connection with the other example, the relation between the various positions of the lever 152, as held by its detent 160 in the different sockets, and the relative positions of the various gears in the two sets, will be readily understood.

A yoke 177 slides parallel with the shafts 126 and 129, on bars 178 and 179 fixed in the casing 155, and has an index plate 180 projecting out through a wide slot 181 in the front of the casing 155. Pivoted on this index plate 180 is a detent 182 with a handle 183, and this detent is pressed down by a helical spring 184, contained in recesses in the detent 182 and index plate 180, respectively. Thus pressed down, this detent 182 enters notches in a boss 185 on the top of the casing, so as to hold the yoke 177 against movement along its bars 178 and 179. The idler gear 186 turns on a stud 187 fixed in the arm 188, which has a pivot 189 on the end of a link 190 that is pivoted on a sleeve 191 on the yoke 177, around the bar 178 on which the yoke slides. The arm 188 has an extension 192 past the stud 187 on which the idler gear 186 is mounted, and this extension 192 is inclined upward at a considerable angle from the arm 188 and extends outside the casing through the slot 181 alongside the index plate 180; and is guided for swinging in a vertical plane by a stirrup 193 on the side of the yoke 177, thus guiding the entire arm 188 and the idler gear 186 mounted thereon. The index plate 180 has a series of twenty-five recesses or sockets 194, 195, 196, 197, 198, 199, 200, 201, 202, 203, 204, 205, 206, 207, 208, 209, 210, 211, 212, 213, 214, 215, 216, 217 and 218, and the extension 192 of the arm 188 has a detent 219 which is adapted to enter any one of these recesses or sockets, accordingly as the arm 188 is swung up and down or backward and forward by virtue of its mounting with the link 190. The recesses or sockets are so positioned in the index plate 180 that the twenty-five different positions given to the arm 188, and, consequently, to the idler gear 186, will bring said idler gear into its proper position to mesh with the desired pair of gears brought opposite in any one of the nine positions of the lever 152 as above described. The driving shaft 126 has a pulley 220, through which the power may be applied to the mechanism.

From the foregoing description it will be seen that twenty-five different speeds may be obtained directly without combining the ratios of two different sets of gears as in the previous example, while involving the use of only eleven gears, and employing no clutch, and the manipulative mechanism is limited to one gear shifting lever, one idler gear shifting bracket and the arm carrying the idler gear on the bracket.

My device is applicable to any kind of machinery where it is desirable to easily and quickly make changes of speed with the driving shaft run at a constant speed. It is possible to make these changes of speed without stopping the machine, since the idler gears may be unmeshed and raised to their highest positions, then the other gears moved to their proper relative positions, and the idler gears then dropped into mesh.

Having fully described my invention, what I claim as new and desire to secure by Letters Patent is:

1. In change-speed mechanism, the combination of two sets of gears on parallel axes and an idler gear, each gear of a set being of a different diameter, and supporting means for said sets of gears and said idler gear whereby the gears of both sets are slidable axially, so that any gear of either set may be brought opposite any gear of the other set, and whereby the idler gear is adjustable axially and transversely and permitted to mesh with any two of all of the gears of the respective sets.

2. In change-speed mechanism, the combination of two sets of gears on parallel axes and an idler gear, each gear of a set being of a different diameter, and means for varying the relative positions of said gears and said idler gear, whereby the idler gear is meshed with any two of all of said gears of the respective sets.

3. In change-speed mechanism, the combination of two sets of gears on parallel axes, each gear of a set being of different diameter, and the gears of both sets being slidable axially, manipulative means for sliding the gears of the respective sets simultaneously in opposite directions, an idler gear, and supporting means for the idler gear whereby it may be adjusted to mesh with different combinations of the gears of the two sets when said gears are given different relative positions as moved by said manipulative means.

4. In change-speed mechanism, the combination of two sets of gears on parallel axes, each gear of a set being of different diameter, and the gears of both sets being slidable axially, manipulative means for sliding the gears of the respective sets simultaneously in opposite directions, an idler gear, and supporting means for said idler gear whereby said idler gear is adjustable axially and transversely, to mesh with different combinations of the gears of the two sets.

5. In change-speed mechanism, the combination of two parallel shafts, a plurality of gears on one of said shafts, each of different diameter, said gears being slidable along said shaft, a plurality of gears on the other shaft, each of different diameter, these gears being slidable along this shaft, manipulative means for sliding the gears on the respective shafts simultaneously in opposite directions, an idler gear, a yoke slidable parallel with said shafts, a link pivoted to slide with said yoke, an arm pivoted to said link, supporting means for said idler gear on said arm, and means for holding said arm stationary in different positions with respect to said yoke, as the arm swings on and with said link.

6. In change-speed mechanism, the combination of two parallel shafts, a plurality of gears on one of said shafts, each of different diameter, said gears being slidable along said shaft, a plurality of gears on the other shaft, each of different diameter, these gears being slidable along this shaft, manipulative means for sliding the gears on the respective shafts simultaneously in opposite directions, an idler gear, a yoke slidable parallel with said shafts, a link pivoted to slide with said yoke, an arm pivoted to said link, supporting means for said idler gear on said arm, means for holding said arm stationary in different positions with respect to said yoke, as the arm swings on and with said link, and means to hold said yoke stationary.

7. In change-speed mechanism, the combination of two parallel shafts, a plurality of gears on one of said shafts, each of different diameter, said gears being slidable along said shaft, a plurality of gears on the other shaft, each of different diameter, these gears being slidable along this shaft, manipulative means for sliding the gears on the respective shafts simultaneously in opposite directions, an idler gear, a yoke slidable parallel with said shafts, a link pivoted to slide with said yoke, an arm pivoted to said link, supporting means for said idler gear on said arm, means for holding said arm stationary in different positions with respect to said yoke, as the arm swings on and with said link, means to hold said yoke stationary, and means to guide said swinging of said arm with respect to said yoke.

8. In change-speed mechanism, the combination of two parallel shafts, a plurality of gears on one of said shafts, each of different diameter, said gears being slidable along said shaft, a plurality of gears on the other shaft, each of different diameter, these gears being slidable along this shaft, manipulative means for sliding the gears on the respective shafts simultaneously in opposite directions, an idler gear, a yoke slidable parallel with said shafts, a link pivoted to slide with said yoke, an arm pivoted to said link, supporting means for said idler gear on said arm, means for holding said arm stationary in different positions with respect to said yoke, as the arm swings on and with said link, means to hold said yoke stationary, means to guide said swinging of said arm with respect to said yoke, and means to hold said yoke stationary.

9. In change-speed mechanism, the combination of two parallel shafts, a plurality of gears on one of said shafts, each of different diameter, said gears being slidable along said shaft, a plurality of gears on the other shaft, each of different diameter, these gears being slidable along this shaft, manipulative means for sliding the gears on the respective shafts simultaneously in opposite directions, an idler gear, a yoke slidable parallel with said shafts, a link pivoted to slide with said yoke, an arm pivoted near one of its ends on said link, a detent on the arm near its other end, supporting means for said idler gear on said arm intermediate of the ends of the arm, means on said yoke to guide the swinging of said arm upon and with said link, and an index plate on said yoke, having means with which the detent of the arm engages to hold the arm in various positions within the range of its swinging.

10. In change-speed mechanism, the combination of two parallel shafts, a plurality of gears on one of said shafts, each of different diameter, said gears being slidable along said shaft, a plurality of gears on the other shaft, each of different diameter, these gears being slidable along this shaft, manipulative means for sliding the gears on the respective shafts simultaneously in opposite directions, an idler gear, a yoke slidable parallel with said shafts, a link pivoted to slide with said yoke, an arm pivoted near one of its ends on said link, a detent on the arm near its other end, supporting means for said idler gear on said arm intermediate of the ends of the arm, means on said yoke to guide the swinging of said arm upon and with said link, an index plate on said yoke, having means with which the detent of the arm engages to hold the arm in various positions within the range of its swinging, a stationary part on said mechanism, and a detent pivoted on said index plate and engaging with said stationary part.

11. In change-speed mechanism, the combination of two parallel shafts, a plurality of gears on one of the shafts, each of different diameter, said gears being slidable along said shaft, a plurality of gears on the other shaft, each of different diameter, these gears being slidable along this shaft, brackets engaging the gears on the respective shafts to slide them along the shaft, a lever, a pivot for the lever midway between the center lines of the two shafts, and articulated connections between said lever and the respective brackets, an idler gear, and means for adjusting said idler gear with respect to said gears on said shafts, to mesh with different combinations of these gears as they are slid along their respective shafts.

12. In change-speed mechanism, the combination of two parallel shafts, a plurality of gears on one of the shafts, each of different diameter, said gears being slidable along said shaft, a plurality of gears on the other shaft, each of different diameter, these gears being slidable along this shaft, brackets engaging the gears on the respective shafts to slide them along the shaft, a lever, a pivot for the lever midway between the center lines of the two shafts, and articulated connections between said lever and the respective brackets, means for holding said lever stationary in different positions, an idler gear, and means for adjusting said idler gear with respect to said gears on said shafts, to mesh with different combinations of these gears as they are slid along their respective shafts.

13. In change-speed mechanism, the combination of two parallel shafts, a plurality of gears on one of the shafts, each of different diameter, said gears being slidable along said shaft, a plurality of gears on the other shaft, each of different diameter, these gears being slidable along this shaft, brackets engaging the gears on the respective shafts to slide them along the shaft, a lever, a pivot for the lever midway between the center lines of the two shafts, and articulated connections between said lever and the respective brackets, means for holding said lever stationary in different positions, an idler gear, supporting means for said idler gear, and means for adjusting said supporting means, whereby said idler gear is adjusted axially and transversely, to mesh with different combinations of said gears on said shafts as they are slid along their respective shafts.

14. In change-speed mechanism, the combination of two sets of gears in axial alinement, each gear of a set being of different diameter, a set of gears on an axis parallel to those of the alined sets, each gear of this set being of different diameter, and being adjustable axially, some of them being adapted to be brought opposite the gears of one of the alined sets, and some of them being adapted to be brought opposite the gears of the other alined set, idler gears, each one of which is adjacent to a respective one of said alined sets, and means for adjusting said idler gears whereby each one may be meshed with different combinations of the gears of the adjacent alined set and the gears opposite on the parallel axis.

15. In change-speed mechanism, the combination of two sets of gears in axial alinement, and a set of gears on an axis parallel to those of the alined sets, each gear of each of said sets being of a different diameter, and being adjustable axially, some of the gears on the parallel axis being adapted to be brought opposite the gears of one of the alined sets, and some of them being adapted to be brought opposite the gears of the other alined set, manipulative means for sliding the gears of the respective opposite sets simultaneously in opposite directions, idler gears, each one of which is adjacent to a respective one of said alined sets, and means for adjusting said idler gears whereby each one may be meshed with different combinations of the gears of the adjacent alined set and the gears opposite on the parallel axis.

16. In change-speed mechanism, the combination of a driving shaft, a driven shaft alined therewith, a lay shaft parallel with said driving shaft and said driven shaft, a plurality of gears on said driving shaft, each of different diameter, said gears being slidable along said driving shaft, a plurality of gears on said driven shaft, each of different diameter, said gears being slidable along said driven shaft, a plurality of gears on said lay shaft, each of different diameter, said gears being slidable along said lay shaft opposite to the gears on the driving shaft, a plurality of other gears on said lay shaft, each of different diameter, said gears being slidable along said lay shaft opposite to the gears on the driven shaft, an idler gear adjacent to the gears on the driving shaft, means whereby said idler gear may be adjusted axially and transversely to mesh with different combinations of the gears on the driving shaft and the gears opposite on the lay shaft, an idler gear adjacent to the gears on the driven shaft, and means whereby this idler gear is adjustable axially and transversely to mesh with different combinations of these gears on the driven shaft and the gears opposite on the lay shaft.

17. In change-speed mechanism, the combination of a driving shaft, a driven shaft alined therewith, a lay shaft parallel with said driving shaft and said driven shaft, a plurality of gears on said driving shaft, each of different diameter, said gears being slidable along said driving shaft, a plurality of gears on said driven shaft, each of different diameter, said gears being slidable along said driven shaft, a plurality of gears on said lay shaft, each of different diameter, said gears being slidable along said lay shaft opposite to the gears on the driving shaft, a plurality of other gears on said lay shaft, each of different diameter, said gears being slidable along said lay shaft opposite to the gears on the driven shaft, an idler gear adjacent to the gears on the driving shaft, means whereby said idler gear may be adjusted axially and transversely to mesh with different combinations of the gears on the driving shaft and the gears opposite on the lay shaft, an idler gear adjacent to the gears on the driven shaft, means whereby this idler gear is adjustable axially and transversely to mesh with different combinations of these gears on the driven shaft and the gears opposite on the lay shaft, and means for directly operatively connecting said driven shaft to said driving shaft.

ALPHEUS FAY.

Witnesses:
CLARENCE PERDEW,
CATHERINE DORAN.

Copies of this patent may be obtained for five cents each, by addressing the "Commissioner of Patents, Washington, D. C."